United States Patent [19]
Abed

[11] Patent Number: 4,949,201
[45] Date of Patent: Aug. 14, 1990

[54] DISK DRIVE HEAD POSITION CONTROLLER WITH STATIC BIAS COMPENSATION AND PLURAL VELOCITY DETECTORS

[75] Inventor: Majeed Abed, Moorpark, Calif.

[73] Assignee: Micropolis Corporation, Chatsworth, Calif.

[21] Appl. No.: 176,432

[22] Filed: Apr. 1, 1988

[51] Int. Cl.⁵ .................... G11B 5/596; G11B 5/56
[52] U.S. Cl. ........................ 360/78.07; 360/77.04
[58] Field of Search ............ 360/77.04, 77.05, 77.11, 360/78.06, 78.07

[56] References Cited
U.S. PATENT DOCUMENTS

| | | | |
|---|---|---|---|
| 4,068,269 | 1/1978 | Commander et al. | 360/78.06 X |
| 4,333,117 | 6/1982 | Johnson | 360/78.06 X |
| 4,379,256 | 4/1983 | Maury | 360/77.08 X |
| 4,536,809 | 8/1985 | Sidman | 360/77.04 |
| 4,547,822 | 10/1985 | Brown | 360/78.07 X |
| 4,724,369 | 2/1988 | Hashimoto | 360/77.05 X |

*Primary Examiner*—Robert L. Richardson
*Assistant Examiner*—David L. Robertson
*Attorney, Agent, or Firm*—Poms, Smith, Lande & Rose

[57] ABSTRACT

A positioning system for a hard disk drive for rapidly and accurately positioning the disk head. A constant bias compensation signal is injected into the feedback loop to reduce positioning delays otherwise caused by a steady state force which is asserted against the head. High and low velocity measuring techniques are also disclosed, along with several techniques for advantageously injecting these measurements into the feedback loop at appropriate times. An improved resonant filter is also disclosed.

22 Claims, 8 Drawing Sheets

DISK DRIVE HEAD POSITION CONTROLLER WITH STATIC BIAS COMPENSATION AND PLURAL VELOCITY DETECTORS

FIELD OF THE INVENTION

This invention relates to hard disk drive systems and, more particularly, to control circuitry for rapidly and accurately positioning a data transfer head over a desired track on a hard disk drive.

BACKGROUND OF THE INVENTION

Hard disk drives are in widespread use today. They provide an economical means for permanently storing large quantities of data in a relatively small space.

As is well known, such devices typically include one or more rotating magnetic disk surfaces, one or more data transfer heads, and positioning means for positioning the heads over a desired track on the rotating magnetic disks. The positioning means typically includes an arm on which each head is mounted connected to a positioning motor. The coil of the motor is connected to servo-feedback circuitry.

In such systems, there usually is a static bias force asserted against the data transfer head and its associated pickup arm when they are at rest over a particular track on a rotating disk. This force usually tends to move the head off of the particular track.

One source of this force is wind which is created by the rotating disk. The force is usually directed radially outwardly from the rotating disk. Its strength increases as the head gets closer to the perimeter of the disk.

Another source of the force is stresses created by the cable which is typically used to connect the moving data transfer head to a stationary portion of the hard disk drive. Both the magnitude and direction of this stress generally vary depending on the position of the head.

A still further source of the static bias force is torsional stress caused by the viscosity of lubricants used in the pivotal joint which supports the moving arms on which the heads are mounted. The direction of this stress is usually opposite of the direction in which the head traveled. The magnitude varies somewhat dependent upon position and also the direction from which the head approached the track.

Existing control circuitry, to applicant's knowledge, makes no attempt to anticipate and compensate for this combined bias force before the data head is positioned over the desired track. As a result, the head is usually pulled off of the desired track after initial positioning, requiring compensation to be applied by the control circuitry to bring the head back. This delays the time when data transfer to or from the desired track may safely take place.

Another problem with existing positioning circuitry lies in the sensing means which are used to detect actual head velocity. More specifically, such sensing circuitry generally does not work well both at high and low velocity. As a result, low velocity measurements are often inaccurate, injecting instability into the system. This further delays the point in time when the system is ready to safely transfer data.

In short, there has been a continuing need for control circuitry which rapidly and accurately positions a hard disk drive head over a desired track and, more specifically, which does not allow added delays to be caused by the static bias force exerted on the head and/or imperfections in the velocity sensing circuitry.

SUMMARY OF THE INVENTION

One object of the present invention is to eliminate these and other problems in the prior art.

Another object of the present invention is to provide control circuitry which rapidly and accurately positions a data transfer head over a desired track in a hard disk drive.

A still further object of the present invention is to provide control circuitry for positioning a hard disk drive head over a desired track which anticipates the static bias force exerted on the head by compensating for the same before the head reaches the desired track.

A still further object of the present invention is to provide control circuitry for positioning a hard disk drive head over a desired track which rapidly compensates for the static bias force exerted on the head after the head reaches the desired track.

A still further object of the present invention is to provide velocity sensing means which accurately determines the velocity of the head at both high and low speeds.

A still further object of the present invention is to provide control circuitry for positioning a hard disk drive head over a desired track which uses improved velocity sensing means in formulating both the desired and actual velocity signals that are used in the velocity servo-loop.

These and other objects of the present invention are achieved through the use of improved control circuitry for positioning a hard disk drive head.

Included is means to inject a D.C. bias signal into the servo-loop shortly before the head comes to rest over the desired track. The magnitude of this D.C. bias signal is substantially equivalent to the signal which the servo-loop would have generated at the injection point of the bias signal in order to have overcome the steady-state bias force on the head if no steady state bias signal had been injected.

In one preferred embodiment, the magnitude of the necessary D.C. bias signal is measured for several tracks (and for both directions of approach) on a sample of production models. The average value for each measurement is then computed and stored in a ROM.

In another embodiment, the magnitude of the necessary D.C. bias signals are computed for each particular unit during an initialization routine when power to the unit is first applied to the system. Alternatively or in addition, these values are computed "on line" each time a particular track is accessed. In either case, the bias signal values are then stored in a RAM.

In a still further embodiment of the invention, no memory is used at all to store these values. Rather, they are instantly computed and applied moments after the head is initially positioned over the desired track.

Improved velocity sensing means are also disclosed. At high velocities, actual velocity is computed based upon the frequency of track crossings. At low velocities, actual velocity is computed by taking the derivative of ramps derived from quadrature positioning signals (discussed in more detail below).

The desired velocity signal which is used in the servo-loop is generated by a microprocessor and is dependent upon actual velocity and numerous system parameters. At high velocity, track crossings are used by the microprocessor to compute desired velocity. At very low velocity, a "fill-in" circuit is used which creates a desired velocity signal which is proportional to the amplitude of a track crossing ramp signal (also discussed in more detail below).

An improved resonant filter having a combined low pass and notch response is also used to enhance system stability and positioning speed.

Through the combined use of bias compensation, track crossing slope detection, "fill in" circuitry, an improved resonant filter, and other features of the present invention, markedly faster positioning times are achieved.

These and other objects, advantages, and features of the present invention will now become apparent as the invention is better understood by reference to the following detailed description when considered in conjunction with the accompanying drawings.

DETAILED DESCRIPTION

Figure 1:
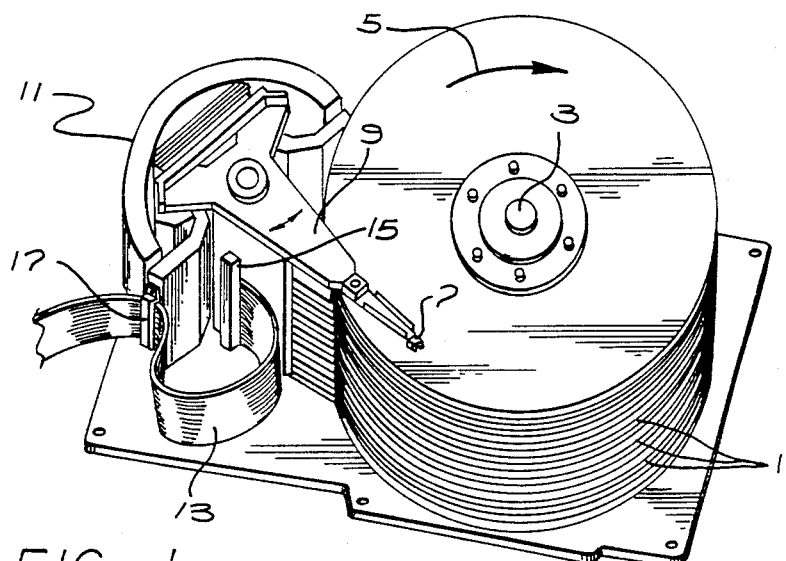
FIG. 1 is a perspective view of certain components in a typical hard disk drive.

FIG. 1 is a perspective view of certain basic components in a typical hard disk drive. Included are a plurality of disks 1 stacked and mounted on a spindle 3 which is rotating as shown by an arrow 5. A plurality of heads 7 (only one is visible in FIG. 1) are held in position over a desired track on the rotating disks 1 by a plurality of arms 9 which, in turn, are pivotally connected to a head positioning motor 11. Data is transferred to or from the heads 7 by electronic signals which travel through a ribbon cable 13 which is connected at a movable end 15 to the arms 9 and at a stationary end 17 to a portion of the frame of the head positioning motor 11.

What has been described thus far is well known in the art as a Winchester disk drive. It is understood, however, that the present invention is applicable to all types of hard disk drives.

As discussed in more detail above under "Background of the Invention", Applicant has observed that a static bias force is usually applied to the heads 7 and the arms 9, completely independent of the force supplied by the head positioning motor 11, when the disks are rotating and the heads 7 are at rest over a desired track. As also described in more detail above, Applicant believes this force is attributable to windage, stresses imposed by the ribbon cable 13, and the viscosity of the lubricants used in the bearings (not visible in FIG. 1) contained within the head positioning motor 11.

Figure 2:
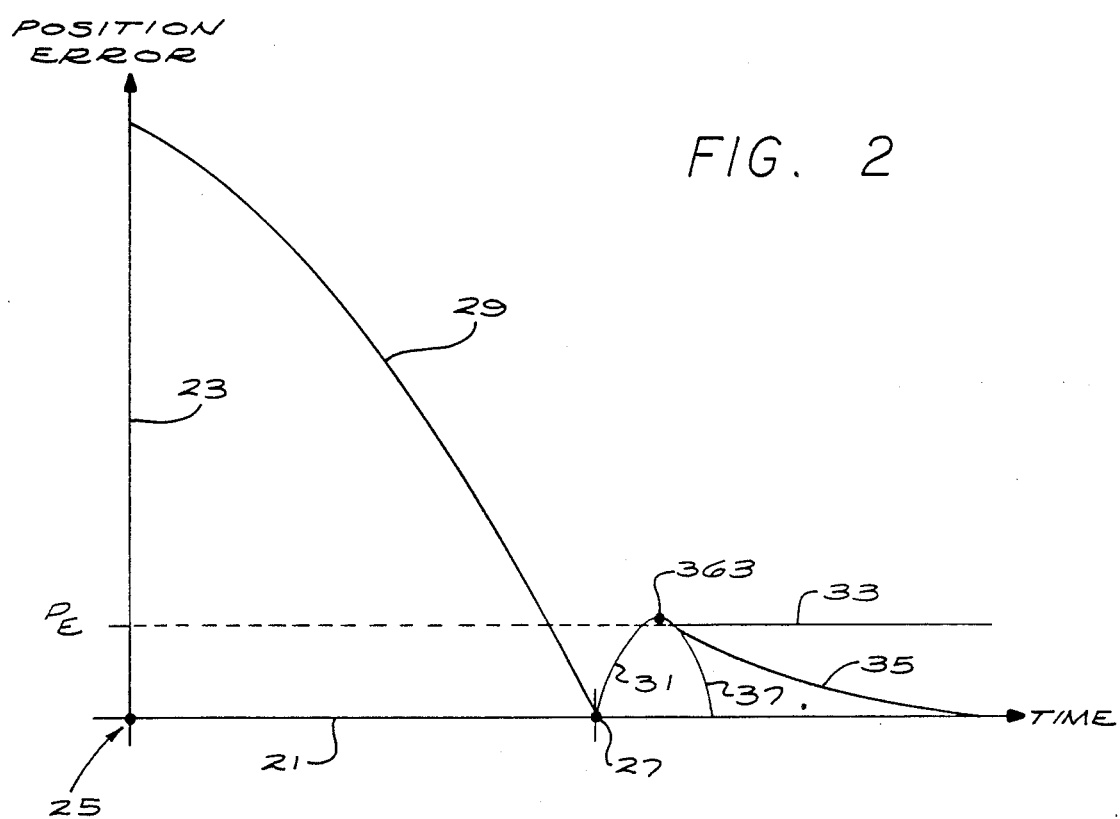
FIG. 2 is a graph of typical head positioning profiles which result when the head is positioned with prior art circuitry and with circuitry constructed in accordance with the present invention.

FIG. 2 illustrates the typical effect of this static bias force on various head positioning profiles, two resulting from use of prior art systems and two resulting from use of systems made in accordance with the present invention.

More specifically, FIG. 2 shows an x-axis 21 which is representative of time and a y-axis 28 which is representative of head positioning error. The axes 21 and 23 intersect at a point 25 which represents a point in time when the heads 7 (shown in FIG. 1) are a few tracks away from a desired track. A point 27 on the x-axis 21 represents the moment in time when the heads 7 are exactly in position over the desired track.

Reference is first made to the positioning profile which results from use of a prior art servo-loop of finite gain, i.e., one which does not contain an integrator. This profile is illustrated by line segments 29, 31, and 33.

In such a system, what physically happens is that the heads 7 are pulled into position over the desired track by the motor 11. This is represented by the line segment 29. Once the point 27 is reached, there is no positioning error being generated. Current through the head positioning motor 11, therefore, will be reduced to zero.

As discussed above, however, a static bias force is nevertheless applied to the heads 7 and arms 9 from sources other than the positioning motor 11. As a result, the heads are pulled off of the desired track, which results in a positioning error illustrated by the line segment 31. (The polarity of the post-on track position error is dependent upon the direction of the static force asserted on the heads 7 and arms 9. Although this is illustrated in FIG. 2 to be positive, it could also be negative.)

As the heads 7 are being pulled off of the desired track, a position error is generated. In turn, this causes counter-acting current to be pumped into the head positioning motor 11 which, in turn, counter-acts the static force being asserted on the heads 7 and the arms 9. Eventually, the counter-acting force will equal the static bias force and the movement of the heads 7 and the arms 9 will stop, as shown by the line segment 33. Because of the finite gain in the servo-loop, however, a finite positioning error, marked in FIG. 2 as $P_E$, will result.

In a more sophisticated prior art positioning system, an integrator is placed in the positioning loop. This causes the system to have an infinite gain. The resulting positioning profile is indicated by line segments 29, 31 and 35.

Although no position error ultimately results, as can be seen by examining the profile 35, much time is needed before the positioning error again goes to zero, i.e. before the heads 7 again are moved back into position over the desired track. The reason is because it takes time for the integrator to integrate the position error into a signal which is sufficient to create a force equal but opposite to the static bias force being asserted on the heads 7 and the arms 9.

With one particular integrating prior art system being used by applicant, the Micropolis 1500 Series of Winchester Disk Drives, the time it took the heads 7 to be repositioned over the desired track after they first reached the desired track was between 5 and 8 milliseconds. With efforts being made to reduce average access times to less than 18 milliseconds, this delay is highly undesirable.

Using the preferred embodiment of the present invention, to be discussed next, applicant has been successful in achieving a position profile equivalent to the line segment 29. It has no over-shoot, thereby eliminating entirely the 5 to 8 millisecond delay found in the prior art integrator systems. (The positioning error represented by segments 29, 31, and 37 will be discussed later during a discussing of an alternative embodiment of the present invention.)

Figure 3:
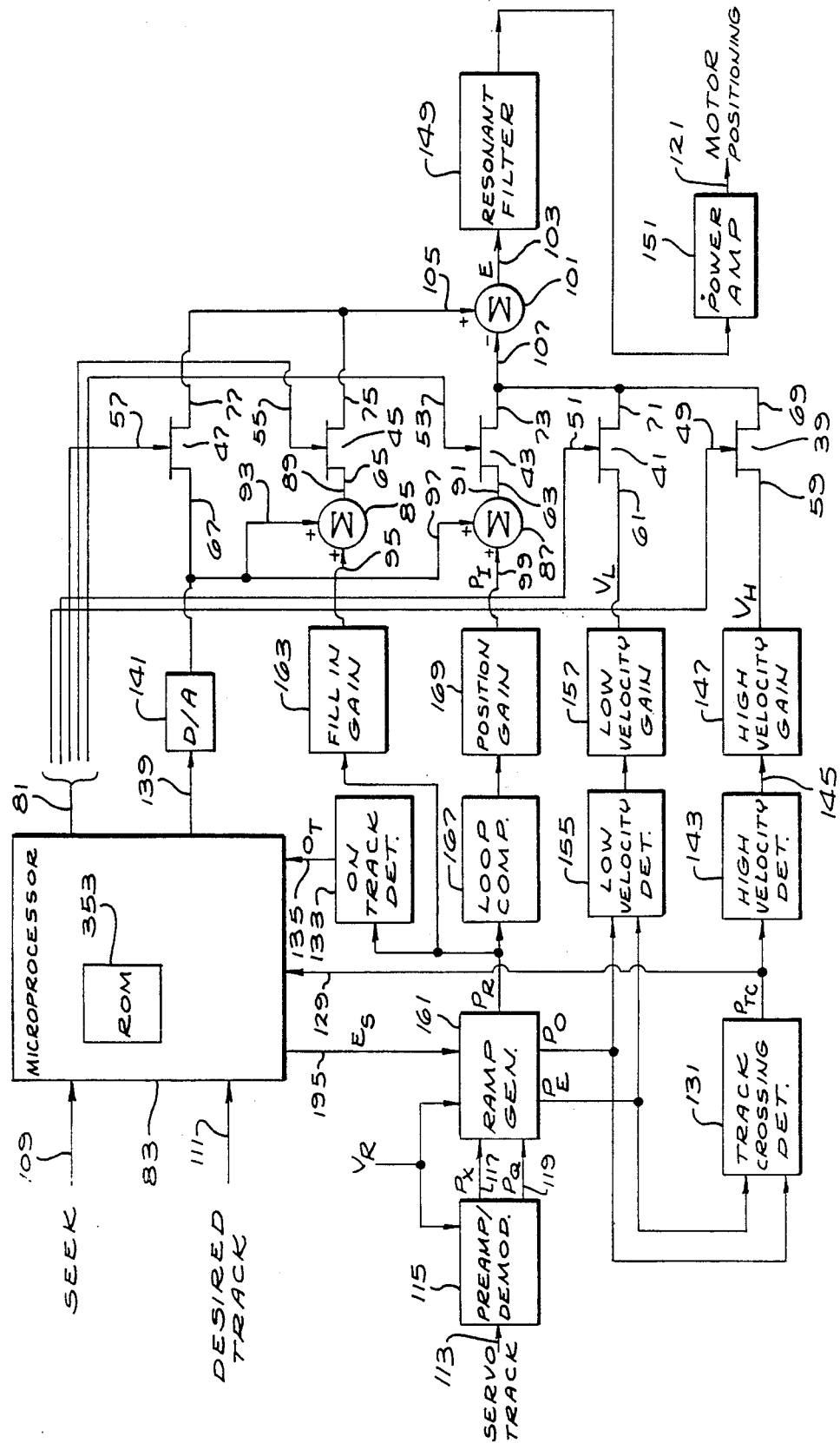
FIG. 3 is a block diagram of the preferred embodiment of the present invention.

Reference is next made to FIG. 3. This is a block diagram of the preferred embodiment of the present invention, the use of which results in the positioning profile illustrated by line segment 29 (only) in FIG. 2.

Each rectangular block in FIG. 3. represents circuitry, the details of which will later be discussed. Switches 39, 41, 43, 45 and 47 are electronic switches which, when activated by an activation signal on their control lines 49, 51, 53, 55 and 57, respectively, pass the electronic signal present at their inputs 59, 61, 63, 65 and 67, respectively, to their outputs 69, 71, 73, 75 and 77, respectively.

Numerous devices, as is well known in the art, can be used for electronic switches 39, 41, 43, 45 and 47. Applicant has found that a particularly well suited device is a DG211 made by National Semi-Conductor. (It is noted that this particular device contains an invertor at the input, requiring all of the input signal to similarly be inverted.)

Summers 85 and 87 are electronic circuits which generate at their outputs 89 and 91, respectively, an electronic signal which is the sum of the electronic signals present at their inputs 93, 95, 97 and 99, respectively.

Similarly, a subtracter 101 is an electronic circuit which generates at its output 103 an electronic signal equivalent to the difference between the electronic signals present at its inputs 105 and 107.

Summers 85 and 87 and subtracter 101 can be any of the well known circuits that perform addition and subtraction of electronic signal, respectively. In the preferred embodiment, applicant chooses to utilized operational amplifiers connected to resistors in configurations which are well known to achieve these results.

There are three principle input signals to the system shown in FIG. 3.

The first input signal is a seek command which is routed over a line 109 to the microprocessor 83. This signal is generated by the system (not shown) which is using the hard disk drive. It instructs the drive to position the heads 7 over a desired track.

The second input signal is the desired track. This signal is also generated by the system using the hard disk drive and is delivered to the microprocessor 83 over bus lines 111. This signal specifies the track over which the heads 7 should be positioned.

The third input signal is a servo-track signal which is connected over a line 113 to a pre-amplifier/ demodulator 115.

The servo-track signal is a feedback signal. It comes from one of the heads 7 (FIG. 1) which is dedicated to reading a di-bit quadrature pattern which has been recorded on a dedicated surface of one of the disks 1 (FIG. 1) in accordance with techniques well known in the art.

As is also well known in the art, the di-bit quadrature pattern is an encoded pattern which, when correctly decoded, produces a pair of signals commonly referred to as the quadrature position error signals $P_X$ and $P_Q$.

The $P_X$ and $P_Q$ signal are triangular wave forms. Each is 90° out of phase with the other. $P_X$ will cross a reference voltage $V_R$ each time the heads 7 cross an even track. $P_Q$ will cross the reference voltage $V_R$ each time the heads 7 cross an odd track. The reference voltage $V_R$ is a D.C. steady state signal having an amplitude equal to exactly half of the peak amplitude of the triangular wave forms $P_X$ and $P_Q$. Typical $P_X$ and $P_Q$ signals are graphically illustrated in the top graph of FIG. 5 during a constant velocity head movement.

Pre-amplifier and demodulator 115 is a circuit which, as is well known in the art, amplifies the servo-track signal and demodulates from it the quadrature position error signals $P_X$ and $P_Q$. Although this circuitry can be custom built, several manufacturers now make such a preamplifier and demodulator in a single chip. These include the ML411 made by Micro Linear and the SSI 32H567 made by Silicon Systems.

Although quadrature position error encoding has been selected for the preferred embodiment, it is to be understood that other types of well known position encoding techniques could alternatively be used in accordance with the present invention.

The principle output of the system shown in FIG. 3 is the motor positioning signal which is sent over a line 121 to the head positioning motor 11. The state of switches 39, 41, 43, 45 and 47 are dependent upon the position of the heads 7. The precise relationship selected for the preferred embodiment is illustrated in FIG. 4.

Figure 4:
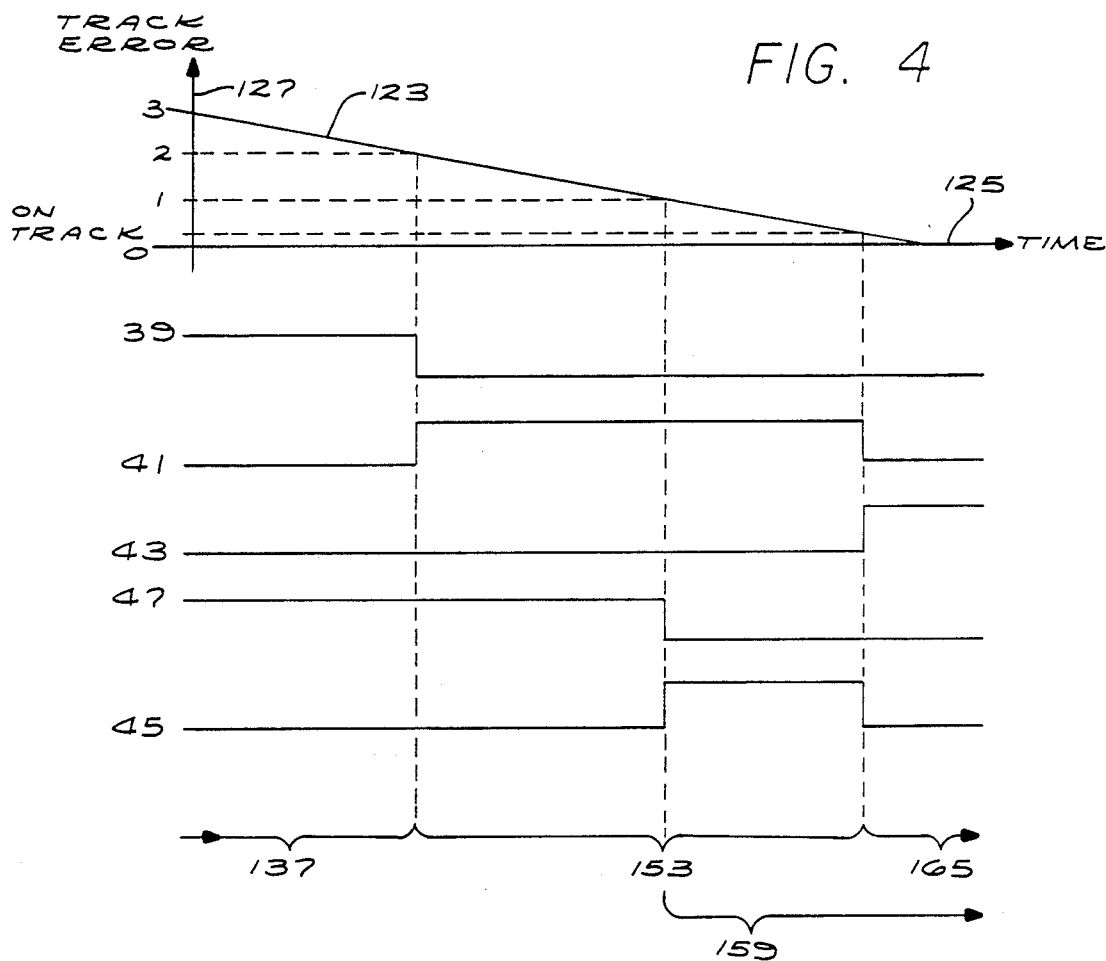
FIG. 4 is a graph showing the status the five switches shown in FIG. 3 relative to the position of the data transfer heads.

More specifically, FIG. 4 illustrates a line segment 123 superimposed on an x-axis which represents time and a y-axis 127 which represents the number of tracks between the heads 7 and a desired track. Below the line segment 123 are graphs showing the states of the switches 39, 41, 43, 45 and 47 with respect to the line segment 123. A low state is open; a high state is closed.

The microprocessor 83 is programmed to deliver appropriate control signals over bus lines 81 to the control inputs 49, 51, 53, 55 and 57 of the switches 39, 41, 43, 45 and 47, respectively, to effectuate these switching state changes at the times indicated in FIG. 4. In order to do this, two further signals are fed to the microprocessor 83.

The first signal is a series of track crossing pulses which are connected to the microprocessor 83 over a line 129. This signal is designated on FIG. 3 as $P_{TC}$ and is generated by a track crossing detector 131. Although this signal along with the circuitry used to generated it will later be discussed in more detail, for the present time it is sufficient to understand that this signal constitutes a series of pulses, one pulse being generated each time the heads 7 pass over a track.

The microprocessor 83 simply counts the pulses being sent over the line 129 and stores that count in an internal register. In accordance with techniques well known the art, this internal register is initialized when power to the system is first applied so that the count in the register will match the actual position of the heads 7. The count derived from the pulses received from the line 129 are, of course, added to or subtracted from the internal register depending upon the direction the heads 7 travel to reach the desired track.

The second additional signal delivered to the microprocessor 83 is an on track signal, designated in FIG. 3 as OT. This is generated by an on track detector 133 and is delivered to the microprocessor over a line 135. It is also indicated on the y-axis 127 in FIG. 4.

Although this signal and the circuitry used to generate it will also later be described in more detail, it is sufficient to understand at this point in time that the on track signal being delivered to the microprocessor 83 will come on when the heads 7 come within a sufficient range of the desired track to safely allow data transfer. In the preferred embodiment, this range is approximately plus or minus 100 microinches.

When a seek command on the line 109 requires movement of the heads 7 to a desired track more than four tracks from the present position of the heads 7, the microprocessor 83 has been programmed to switch the system in FIG. 3 into high velocity mode. This means that switches 39 and 47 will be closed, while all other switches will be open, as shown by the status of these switches during a time segment 137 in FIG. 4.

During this high velocity mode, the microprocessor 83 is programmed to output on bus lines 139 a digital signal representative of the desired velocity for the heads 7.

This desired velocity is computed in accordance with techniques well known in the art which take into consideration the distance between the actual and desired track, as reflected by the internal register in the microprocessor 83 and the system power, gain, and stability.

The desired velocity digital signal is then delivered over the bus lines 139 to a digital-to-analog converter 141 with transforms the digital signal present on the bus lines 139 into an analog signal and delivers the same to the input line 67 of the switch 47.

The digital-to-analog converter 141 can be any of the well know types. It merely must have the needed input bit width, output dynamic range, and response time.

Since the switch 47 is closed in the high velocity mode, the desired velocity signal is delivered to the plus input 105 of the subtracter 101.

At the same, the actual velocitY of the heads 7 is being monitored by a high velocity detector 143. This detector takes the track crossing pulses generated by the track crossing detector 131 and generates an output voltage on a line 145 which has an amplitude that is proportional to the frequency of the track crossing pulses. (The details of this circuit will also be described later.) The high velocity signal on the line 145 is then scaled by a high velocity gain circuit 147. The gain factor for the high velocity gain circuit 147 is selected in accordance with techniques well known in the art to minimize response time without creating instability problems.

The output from the high velocity gain circuit 147 is delivered to the input 59 of the electronic switch 39 which, as previously indicated, is also closed in the high velocity mode. Thus, the actual velocity of the heads 7 is delivered at the output 69 of the electronic switch 39 to the subtracting input 107 of the subtracter 101. The output E of the subtracter 103 therefore represents the difference between the desired velocity of the heads 7 and their actual velocity, i.e., a velocity error signal.

What has thus far been described is a high velocity feedback loop. The velocity error signal E is then delivered to a resonant filter 149. As is well known in the art, such filters enhance system response and stability. In the preferred embodiment, applicant utilities an elliptic filter having a combined low pass and notch response, the details of which will also be described later.

The output of the resonant filter 149 is delivered to the input of a power amplifier 151. As is well known in the art, a power amplifier is used to transform the varying voltage input signal, which is representative of error, to a proportional motor current.

The output of the power amplifier 151, in turn, is then connected via the line 121 to the head positioning motor 11 shown in FIG. 1. The head positioning motor 11, in turn, generates a torque proportional to the current generated by the power amplifier 151, causing movement of the heads 7.

In short, the high velocity mode generates motor torque which is proportional to the difference between the desired velocity and the actual velocity of the heads 7.

When the heads 7 come within two tracks of the desired track, the microprocessor 43 switches the system shown in FIG. 3 to the low velocity mode, which is indicated by a time segment 153 in FIG. 4. (If the desired track position was originally less than four tracks away from the actual head position, the microprocessor 83 is programmed to have started out in the low velocity mode, rather than in the high velocity mode. In this instance, there would have been no change of switching states when the heads 7 came within two tracks of the desired position. Rather, the initial switch states when the seek command was received would have been the same as the switch states indicated at the beginning of the time segment 153.)

As best understood by consideration of FIGS. 3 and 4 together, the initial difference between the high velocity mode and the low velocity mode is that a different velocity detector is switched in. More specifically, the high velocity detector 143 in the low velocity mode is disconnected by the switch 39 being turned off. Instead, the output of a low velocity detector 155, after being scaled by a low velocity gain circuit 157, is delivered to the subtracting input 107 of the subtracter 101 through closure of the switch 41.

The low velocity detector 155 is substituted for the high velocity detector 143 at this point in time because of the inability of the high velocity detector 143 to provide accurate measurements of actual head velocity when the heads 7 are very close to the desired track. This is because the actual velocity of the heads 7 may be changing substantially between the pulses generated by the track crossing detector 131. As a result, although the actual velocity is changing substantially, the output from the high velocity detector 143 on the line 145 is not closely tracking these changes. This can cause system instability and associated delays in the positioning of the heads 7 over the desired track.

Figure 5:
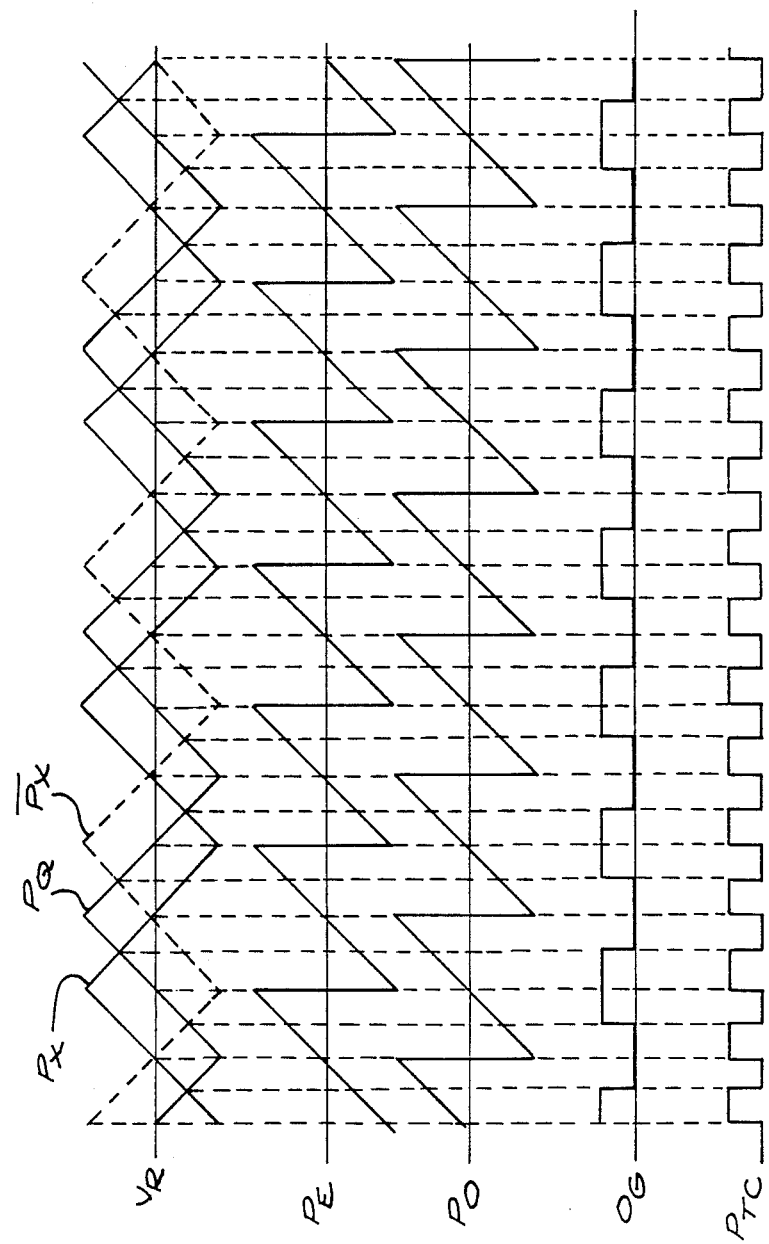
FIG. 5 is a graph showing the relative timing and magnitude of certain of the head positioning signals labelled in FIG. 3 while the head is moving at constant velocity.

The low velocity detector 155, on the other hand, does not work simply by measuring the frequency of track crossing pulses. Instead, it measures the slope of ramp signals $P_E$ or $P_O$. Although more will be said about these ramp signals and the low velocity detector 155 later, it is sufficient now to understand that $P_E$ is a ramp signal which resets every even track crossing, while $P_O$ is a ramp signal which resets every odd track crossing. Both are also shown in FIG. 5.

Aside from the change over to a more sensitive velocity detector circuit, the operation of the system shown in FIG. 3 in the low velocity mode is otherwise the same as in the high velocity mode. As with the high velocity detector 147, the low velocity detector 155 is also scaled by a gain factor, the low velocity gain 157. It is selected so that there will not be any appreciable discontinuity at the input 107 of the subtracter 101 at the time of the change over from the high velocity detector 145 to the low velocity detector 155.

Once the heads 7 come within one track of the desired track, two further switching changes are made to the system shown in FIG. 3, as shown in FIG. 4.

The first change is made because of difficulties the microprocessor 83 has in generating an accurate desired velocity command over the bus lines 139 at this point in time. As previously discussed, the desired velocity command is delivered over the bus lines 139 from the microprocessor 83 based on the value stored in its internal track position register. This register, in turn, is updated by merely counting the track crossing pulses being delivered to the microprocessor 83 over the line 129. Once the heads 7 are within one track of the desired track, however, there won't be any more track crossing pulses until the heads 7 reach the desired track. Hence, the internal register will be updated too slowly.

To alleviate this problem, at the commencement of a time segment 159, the microprocessor 83 is no longer used to generate the desired velocity signal. Instead, the electronic switch 47 is opened and a "fill in" system is enabled by closure of the electronic switch 45.

Unlike the microprocessor 83, this "fill in" system does not derive its desired velocity signal by counting track crossing pulses. Instead, it derives its desired velocity signal by directly scaling a position ramp signal $P_R$ which is generated by the ramp generator 161. $P_R$ is a ramp which goes from full amplitude to zero as the heads 7 travel over the last two tracks before reading the center point of the desired track. It is discussed in more detail later.

As can be seen from an examination of FIG. 3, the "fill in" for the desired velocity signal which is outputted by the fill in gain 163 is still further processed before it reaches the plus input 105 of the summer 101. More specifically, a new signal present at the input 93 of the summer 85 is first added to it.

This new signal, as can be seen from FIG. 3, comes from the digital-to-analog converter 141 which, in turn, comes from the microprocessor 83 over the bus lines 139.

Prior to entry into the time segment 159 shown in FIG. 4, the output on the bus line 139 from the microprocessor 83 represented a desired velocity signal. Following entry into the segment 159, however, the microprocessor 83 is programmed to deliver a different type of signal over the bus lines 139.

More specifically, the value of the signal delivered to the bus lines 139 by the microprocessor 83 following entry into the time segment 159 now represents what applicant calls bias compensation. This is a steady state signal which will remain constant at least until the heads 7 come to rest over the desired track.

The procedure for pre-determining the magnitude of this signal will later be discussed. For the present time, it is sufficient to understand that this new signal is generated by the microprocessor 83 to anticipate and compensate for the steady state bias force which, in prior art systems, causes the heads 7 to temporarily deviate from the desired track after they first reach the desired track, as discussed above.

Once the heads 7 come sufficiently close to the desired track to permit error-free data transfer, a signal from the on track detector 133 is generated. This point in time is indicated in FIG. 4 as the entry into a time segment 165 and is also marked on the y-axis 127 as "on track".

Following entry into the time segment 165, the velocity loop is disabled by the opening of electronic switches 41 and 45. Instead, a positioning loop is closed through the closure of electronic switch 43.

In the positioning loop mode, the position ramp signal $P_R$ generated by the ramp generator 161 directly controls the positioning of the heads 7. As is well known in the art, such a signal is first delivered through a lead-lag loop compensation circuit 167 and then scaled appropriately by a gain circuit 169. The details of this circuit also will be discussed in more detail later.

The steady state bias compensation signal is still being generated by the microcomputer 83 in the positioning loop mode. It is injected into the positioning loop by delivering it to the summing input 97 of the summer 87. The bias compensation signal continues to compensate ahead of time for the anticipated steady state force which would otherwise cause the heads 7 to temporarily deviate off of the desired track after they reach the desired track.

To summarize up to this point, the preferred embodiment of applicants invention shown in FIG. 3 has a high velocity mode, a low velocity mode, and a positioning mode. In the high velocity mode, track crossings are used to measure actual head velocity and to generate the desired velocity signal. In the low velocity mode, the slope of a ramp positioning signal is used to measure actual head velocity. In the beginning of the low velocity mode, track crossings are still used to generate the desired velocity signal. Later, the slope of the ramp signal is used instead and is injected through a "fill in" circuit. A constant bias compensation signal is also injected at the end of the low velocity mode and throughout the positioning mode.

The technique for determining the magnitude of the constant bias compensation signal generated by the microprocessor 83 constitutes a further and significant part of the present invention.

More specifically, the bias compensation value is set to be substantially equivalent to the magnitude of the signal which the position gain circuit 169 would, in the absence of a bias compensation signal, have ultimately generated in order to have counter-acted the static bias force. As explained above, without the bias compensation, the positioning loop (which contains an integrator in the loop compensation circuit 167) would ultimately generate an offset signal at the output of the position gain circuit 169 in order to counter-act the steady state force being asserted on the heads after they reach a desired track. Rather than waiting for this to occur, the system instead injects a signal of substantially the same magnitude into the positioning loop before the heads reach the desired track.

To further increase system stability and positioning speed, this same bias signal is also injected into the low velocity loop when the heads are within one track of the desired track, as explained above and as also shown in FIGS. 3 and 4. Although the bias compensation signal could be scaled before injection into the low velocity loop, i.e., by inserting a scaling circuit between the output of the digital-to-analog converter 141 and the input 93 to the summer 85, Applicant has selected his fill in gain 163 such that this is not necessary. More specifically, the fill in gain 163 is set such that the output 89 of the summer 85 immediately following entry into the time segment 159 is substantially the same as the output of the digital-to-analog converter 141 immediately prior to entry into the time segment 159. In this way, the transition from using the microprocessor 83 for generating the desired velocity signal to using the fill in gain 163 for generating the signal will be a smooth and continuous one.

Figure 6:
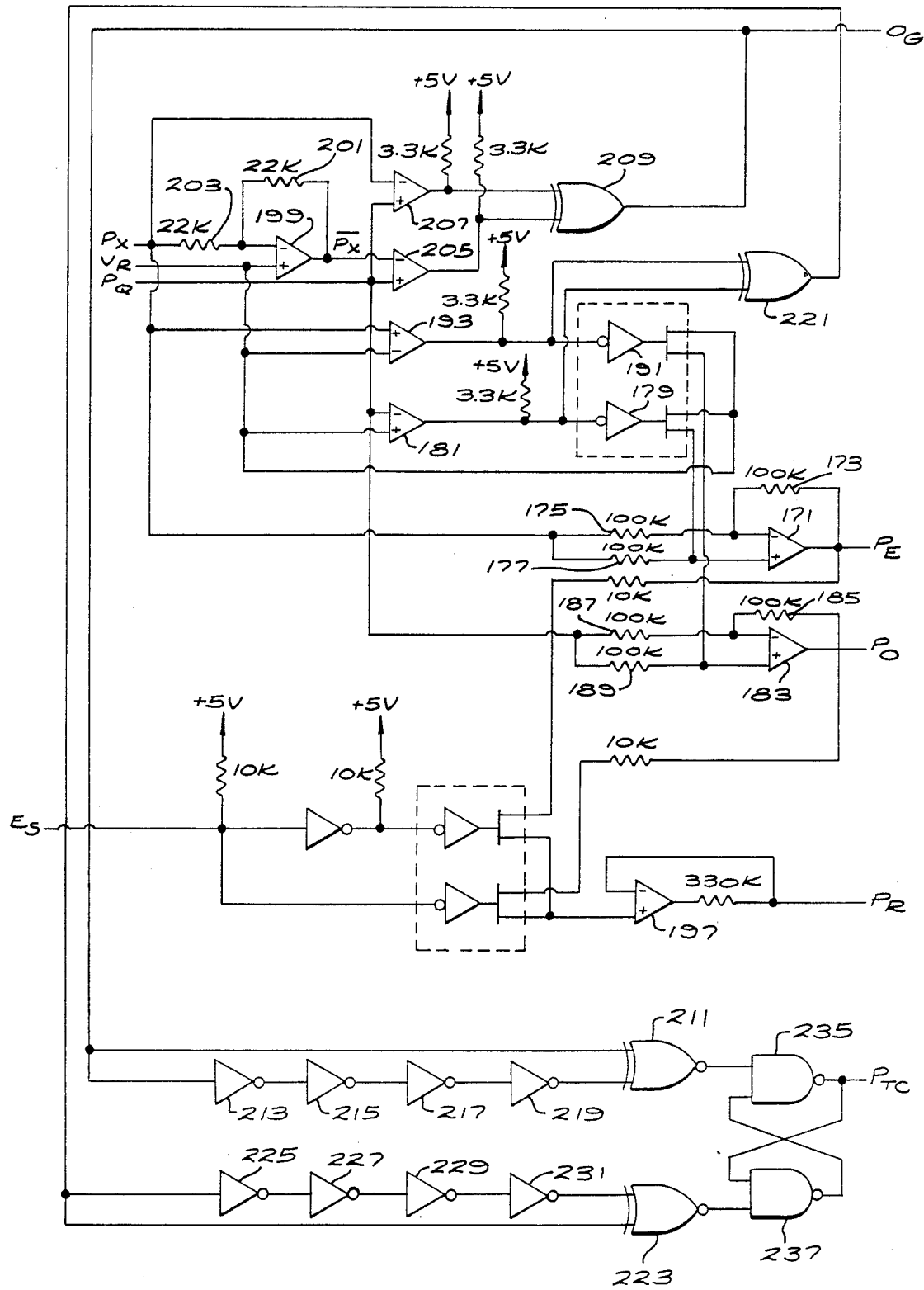
FIG. 6 is a schematic diagram of the preferred circuitry for the ramp generator and track crossing detector shown in FIG. 3.

As previously discussed, the pre-amplifier/demodulator 115 shown in FIG. 3 generates $P_X$, $P_Q$ and $V_R$. As is well known in the art and as also explained above, $P_X$ and $P_Q$ are sawtooth signals. $P_X$ crosses the steady state reference voltage $V_R$ each time the heads 7 cross an even track. $P_Q$ crosses the steady state reference voltage $V_R$ each time the heads 7 cross an odd track. These signals are shown in FIG. 6.

Each of these sawtooth signals are processed into a ramp signal. $P_X$ is processed into the even ramp signal $P_E$. $P_Q$ is processed into the odd ramp signal $P_O$.

Just as with $P_X$ and $P_Q$, $P_E$ and $P_O$ cross $V_R$ when the heads 7 cross tracks, PE crossing only on even track crossings, and $P_O$ crossing only on odd track crossings. These signals are also illustrated in FIG. 5.

Another important signal, also discussed above, is the positioning ramp signal $P_R$. $P_R$ will be identical to $P_E$ if the desired track is even. It will be identical to $P_O$ if the desired track is odd. In this way, $P_R$ will not contain any discontinuously during the last track of head movement. This is important because $P_R$ is used by the system for several purposes during the last track of travel, as explained above during the discussion of FIG. 3.

The system which converts the $P_X$ and $P_Q$ signals into the $P_E$, $P_O$ and $P_R$ signals is the ramp generator 161 shown in FIG. 3. Preferred circuitry for this ramp generator is shown in FIG. 6.

As shown in FIG. 6, $P_X$ is processed by an operational amplifier 171 which is configured with resistors 173, 175 and 177 to provide a unity inverting or noninverting gain depending upon the state of an electronic switch 179. If the electronic switch 179 is closed, amplification will be inverted. Otherwise, it will be non-inverting. The electronic switch 179, in turn, is driven by a comparator 181 which, in turn, is driven by $V_R$ and $P_Q$.

The net result is that the operational amplifier 171 will provide an output $P_E$ which is equivalent to $P_X$ during the rising slope of $P_X$ and equivalent to the inversion of $P_X$ during the falling slope of $P_X$.

An operational amplifier 183 is similarly configured with resistors 185, 187, and 189, an electronic switch 191, and a comparator 193, to similarly process $P_Q$ into $P_O$.

$P_R$ is generated by an operational amplifier 197 which is configured for unity non-inverting gain. It will be equivalent to $P_E$ if $E_S$ is high, but will be equivalent to $P_O$ if $E_S$ is low. $E_S$, in turn, is the even seek signal which comes from the microprocessor 83 over a line 195 (see FIG. 3). It will be high if the desired track is even and low if the desired track is odd.

The remaining circuitry in FIG. 6 implements the track crossing detector 131 in FIG. 3.

More specifically, an operational amplifier 199 is configured with resistors 201 and 203 to produce a unity inverting gain, thereby producing $P_X$, $P_X$ and $P_Q$ are then compared by comparators 205 and 207 in accordance with their connections to these signals as shown in FIG. 6. The comparison results are then delivered to an exclusive OR gate 209 and then to an exclusive NOR gate 211, both directly and also through a series of delaying inventor gates 213, 215, 217 and 219. The resulting output of the exclusive NOR gate 211 is a very short pulse during each odd track crossing.

$P_X$, $P_Q$ and $V_R$ go through similar logic processing by comparators 181 and 193, exclusive OR gate 221, exclusive NOR gate 223, and invertor gates 225, 227, 229 and 231. The output of the exclusive NOR gate 223 is similarly a very short pulse, except that it occurs during each even track crossing.

Last, the output of the exclusive NOR gates 211 and 223 are delivered to the set and reset inputs, respectively, of two cross-coupled NAND gates 235 and 237, resulting in the track crossing pulse train $P_{TC}$, which is also shown graphically in FIG. 5.

Figure 7:
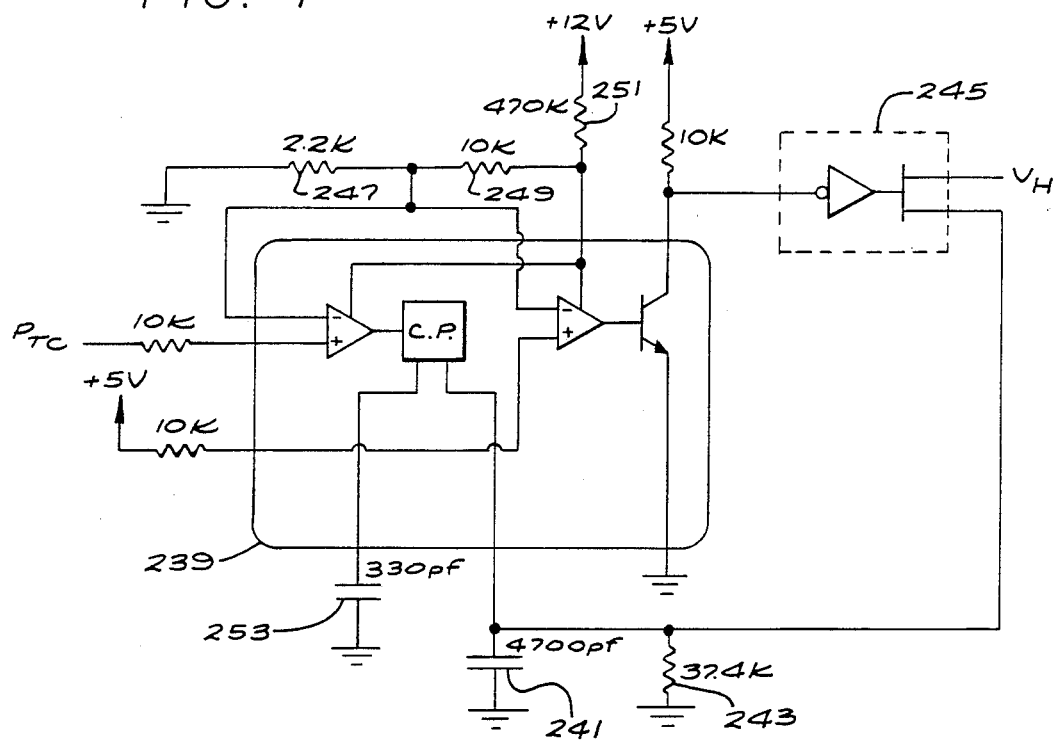
FIG. 7 is a schematic diagram of the preferred circuitry for the high velocity detector and high velocity gain shown in FIG. 3.

FIG. 7 is a schematic diagram of the high velocity detector 143 and the high velocity gain circuit 147 shown in FIG. 3.

As previously discussed, the purpose of this circuit is to transform the track crossing pulses $P_{TC}$ into a voltage $V_H$ (see FIG. 3) which is proportional to the frequency of the track crossings.

To achieve this, the track crossing signal $P_{TC}$ is fed into a charge pump 239. This is a device which charges a capacitor 241 with a pre-determined amount of current each time a pulse from $P_{TC}$ is received. Simultaneously, charged current in capacitor 241 is gradually being bled by a resistor 243. Thus, if the frequency of pulses emanating from $P_{TC}$ is great, the voltage across capacitor 241 will be great. On the other hand, if the frequency is low, the voltage across capacitor 241 will similarly be low.

Although several well-known types of charge pumps could be used for the charge pump 239, in the preferred embodiment, Applicant uses a National 2917. Resisters 247, 249 and 251 provide reduced voltages for internal reference purposes. A capacitor 253 establishes the width of the current pulse. An electronic switch 245 is used to ensure that stray current is not delivered into the capacitor 241 during unpredictable power-up conditions.

Figure 8:
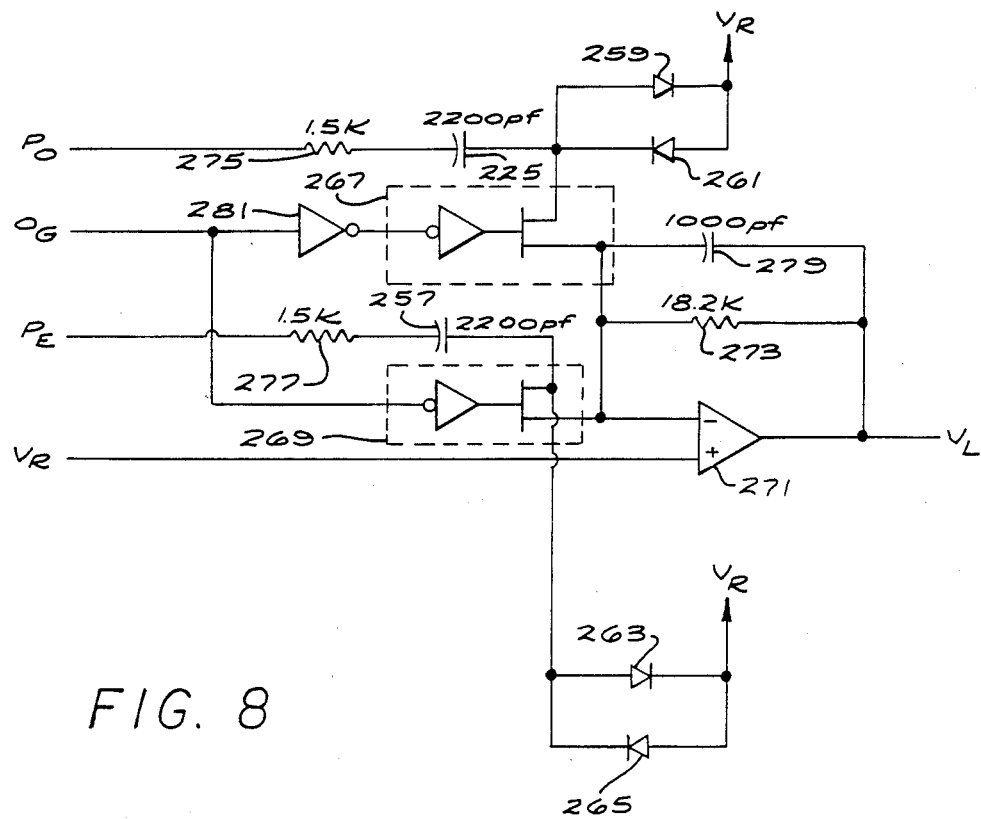
FIG. 8 is a schematic diagram of the preferred circuitry for the low velocity detector and low velocity gain shown in FIG. 3.

FIG. 8 is a schematic diagram of preferred circuitry which implements the low velocity detector 155 and the low velocity gain 157 shown in FIG. 3.

In essence, this circuit takes the derivative of the odd ramp $P_O$ and the even ramp $P_E$ through the use of capacitors 255 and 257, respectively. Diodes 259, 261, 263 and 265 serve to respectively clamp the derivative signals so that they do not swing negatively. Electronic switches 267 and 269 selectively deliver each derivative signal to an operational amplifier 271. This operational amplifier linearly amplifies the selected derivative signal at a gain equivalent to the ratio of a resistor 273 to a resistor 275 or a resistor 277, depending upon which one has been connected to the amplifier 271 by the electronic switches 267 and 269. A capacitor 279 acts as a filter to eliminate undesirable stray noise.

Electronic switches 267 and 269 are configured to cause then operational amplifier 271 to switch between the different derivative signals so that the discontinuities caused by the resetting of the ramp signals $P_O$ and $P_E$ are ignored. This is achieved by using the odd gate signal $O_G$ developed by the circuit shown in FIG. 6, to alternately energize electronic switches 267 and 269 through the use of an intervening invertor 281. $O_G$ is also shown in FIG. 5.

Figure 9:
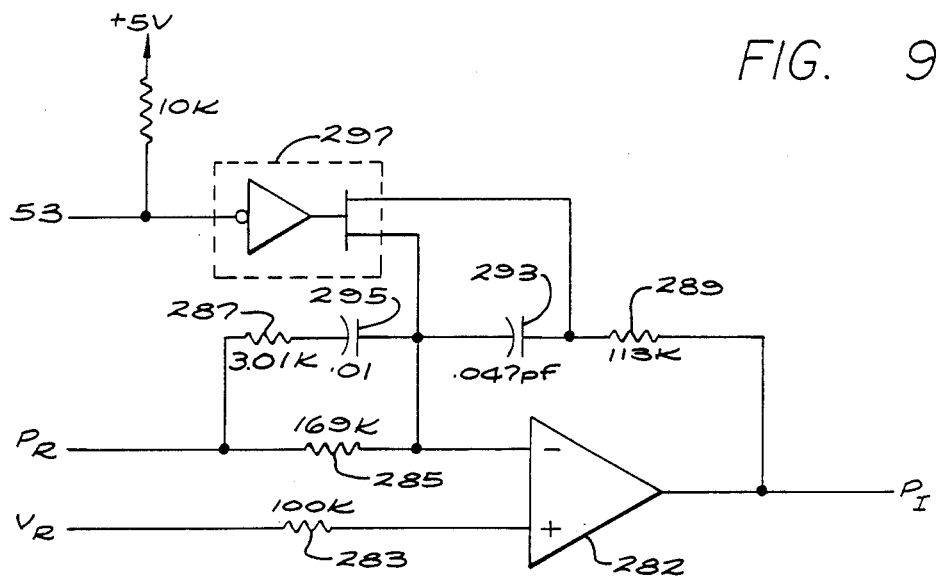
FIG. 9 is a schematic diagram of the preferred circuitry for the loop compensation and position gain shown in FIG. 3.

FIG. 9 is a circuit of the preferred embodiment of the loop compensation 167 and the position gain 169 shown in FIG. 3. As shown in FIG. 9, this circuit consists of an operational amplifier 282 configured with resistors 283, 285, 287 and 289 and capacitors 293 and 295 in a classic integrating lead/lag network.

The transfer function G(S) of this circuit is:

$$G(S) = \frac{38.2 \, (S + 188) \, (S + 581)}{S \, (S + 33,220)}$$

For further information concerning the construction of filters based on transfer functions, reference can be to Budak, *Passive and Active Network Analysis and Synthesis*. Houghton Mifflin Co., Boston, Mass. (1974) and Williams, *Electronic Filter Design Handbook*, McGraw-Hill Book Co., 1221 Avenue of the Americas, New York, N.Y. 10020 (1981).

Of course, other types of loop compensation with different components and/or transfer functions could also advantageously be used, all within the scope of the present invention.

Figure 10:
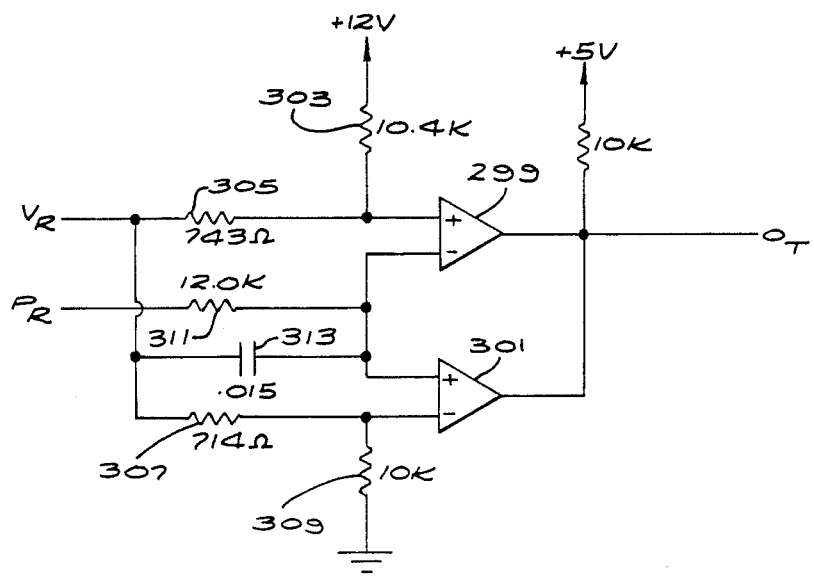
FIG. 10 is a schematic diagram of the preferred circuitry for the on-track detector shown in FIG. 3.

The loop compensation circuit shown in FIG. 9 further includes an electronic switch 297 which is used to discharge the integrating capacitor 293 during periods of time when the positioning loop is not connected. Since this corresponds inversely with the status of switch control line 53, the signal on control line 53 is used to drive the electronic switch 297 (which, as indicated in FIG. 9, has an inverting input). FIG. 10 is a schematic diagram of the preferred embodiment of the on track detector 133 shown in FIG. 3.

As shown in FIG. 10, comparators 299 and 301 are connected in association with resistors 303, 305, 307 and 309 to form a positive and negative voltage limit which, if $P_R$ falls within it, will cause the output OT to go high. The magnitude of the positive limit, as is well known in the art, will be equivalent to $V_R$ times the ratio of resistor 303 to resistor 305. Similarly, the magnitude of the negative limit will be $V_R$ times the ratio of resistor 307 to resistor 309. In the preferred embodiment, 100 microinches is considered on track, which corresponds to a voltage of plus or minus 400 millivolts. A resistor 311 and a capacitor 313 are included to filter undesirable noise which may be present in $P_R$.

Figure 11:
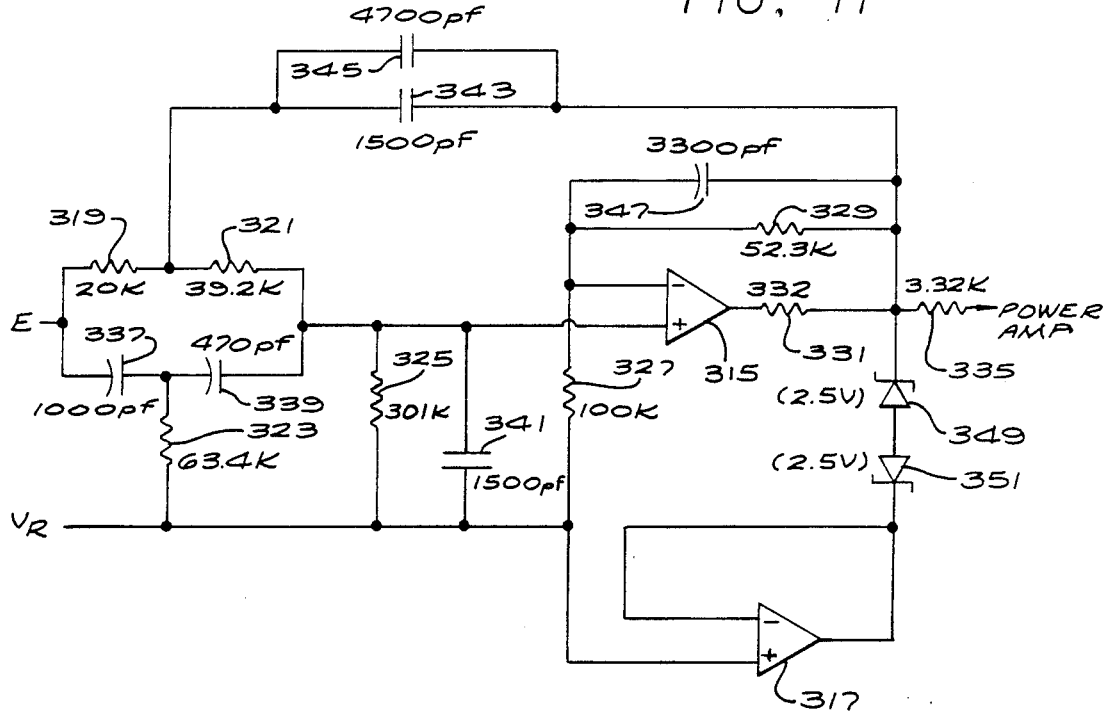
FIG. 11 is a schematic diagram of the preferred circuitry for the resonant filter shown in FIG. 3.

FIG. 11 is a schematic diagram of the preferred embodiment of the resonant filter 149 shown in FIG. 3. It includes operational amplifiers 315 and 317, resistors 319, 32, 323, 325, 327, 329, 331 and 335, and capacitors 337, 339, 341, 343, 345 and 347 configured to provide an elliptical filter having the following combined low pass and notch transfer function T(S):

$$T(S) = 9.5 \times 10^{-2} \frac{(S^4 + 2.51 \times 10^4 S^3 + 7.85 \times 10^8 S^2 + 1.66 \times 10^{13} S + 8.77 \times 10^{16})}{(S^4 + 3.28 \times 10^4 S^3 + 4.11 \times 10^8 S^2 + 1.53 \times 10^{12} S + 6.51 \times 10^{15})}$$

Again, reference can be made to the previously cited texts by Budak or Williams for further information concerning the construction of filters from transfer functions.

The circuit further includes zenor diodes 349 and 351 connected back to back. In conjunction with operational amplifier 317, these zenor diodes prevent the output signal from exceeding the breakdown voltages of the zenor diodes. This prevents saturation of the power amplifier 151.

As previously indicated, the bias compensation value which the microprocessor 83 generates is the steady state value which otherwise would have been generated by the system shown in FIG. 3 at $P_I$, i.e. the plus input 99 to the summer 87. Since the magnitude of the bias force asserted on the heads 7 generally varies as a function of the desired track number and the approach direction to that track, as explained above, the microprocessor 83 must be capable of storing two different values for each track.

One technique for determining these values would be to disconnect the input 97 to the summer 87 and then to measure the steady state value of $P_I$ for each track and directional approach. This technique, however, may load the sensitive circuitry and produce erroneous results.

Another technique is to simply measure the current which is delivered to the head positioning motor 11 while the heads 7 are steadily positioned over each track following an approach form both directions. The value to be injected as bias compensation for this track and such directional approach can then be calculated from this current reading, based on the known transfer function of the control circuitry.

In the preferred embodiment, Applicant has designed his hard disk drive such that the static force asserted on the heads 7 and the arms 9 is approximately zero when the heads 7 are on the center track.

Applicant then takes a sampling of production models and, on each, measures the various amounts of current which are fed to the positioning motor 11 while the heads 7 are stably positioned over each track and for each direction of approach.

Applicant then averages all the readings made on each machine and computes the necessary bias compensation value in accordance with the procedure explained above. These average values are then stored in a ROM 353 (shown in FIG. 3) which is a part of the microprocessor 83.

Although measurements can be made and stored for each track, applicant has found that these measurements do not vary significantly between tracks which are close together. To save memory space, applicant therefore simply takes and stores measurements for every eight tracks and uses the closest stored value during a seek operation.

Figure 12:
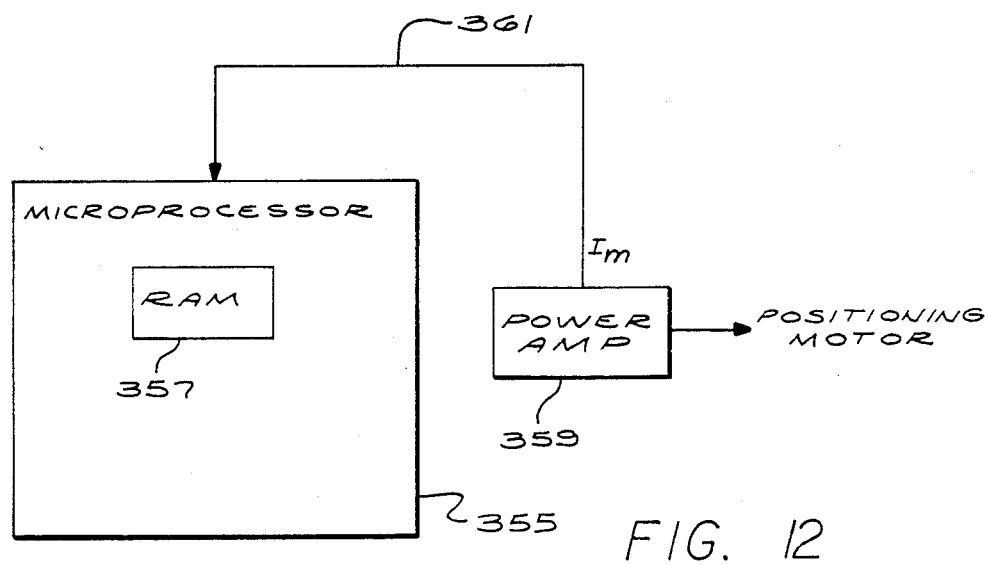
FIG. 12 is a partial block diagram of an alternate embodiment of the present invention.

An alternate technique for ascertaining these values is illustrated by the partial block diagram shown in FIG. 12.

More specifically, FIG. 12 illustrates a microprocessor 355 having a RAM 357 and a power amplifier 359 which generates a signal, $I_m$, which is a measurement of the current through the head positioning motor 11. Other than for these differences, the overall system from which the partial block diagram of FIG. 12 has been taken is identical to the system shown in FIG. 2.

Operationally, the microprocessor 355 is programmed to determined the appropriate bias compensation values during an initialization routine when the hard disk is first powered up. More specifically, the microprocessor 355 is programmed to generate its own seek instructions so as to cause the heads 7 to sequentially access every single track on the hard disk drive from both directions. After each access is complete, i.e., after the heads 7 come to rest over the desired track from one of two directions, the static current necessary to hold the heads in position is measured by the power amplifier 359. This can conveniently be done by placing a low resistance in series with the lead to the head positioning motor 11 and by measuring the voltage drop across that resistor.

The measured current values are then delivered to the microprocessor 355 over a line 361. In turn, the microprocessor 355 computes the bias compensation value which would be necessary to generate such a static current. Just as Applicant did with the embodiment discussed above, this is done based on the known transfer function of the system. These computed bias compensation values are then stored in the RAM 357 and are later accessed by the microprocessor 355 in the same way that such values were read from the ROM 353 shown in FIG. 3.

In practice, seeking every single track in both directions would be a very time-consuming process. To reduce this time, Applicant chooses in this alternative embodiment to seek only representative tracks from both directions and to extrapolate from these representative readings the bias compensation values in between.

In practice, Applicant has found that the relationship between the necessary compensation values and the desired track is least linear for the inner and outer tracks of the disks. Accordingly, in this sampling embodiment, the inner and outer tracks are sampled at a greater frequency than the center tracks. More specifically, Applicant would sample the inner and outer tracks at 50-track intervals while he would sample center tracks at intervals between 100-200 tracks. Between samplings, Applicant chooses to utilize a straight line approach for extrapolating the in between bias compensation values. Alternately, the nearest sampling valve could be used. Other computational techniques, including non-linear ones, could also be used, all within the scope of the present invention.

The microprocessor 355 could alternately be programmed to simply measure and calculate the bias compensation values while the system is actually being used, i.e. while the system is "on line," rather than during an initialization routine. Although this would reduce the time needed to initialize the system, it would also increase the amount of time needed to access each particular track from each direction on the first occasion.

In a still further embodiment, Applicant contemplates a combination of these two measuring techniques, i.e., a quick and coarse sampling during the initialization routine, followed by corrective sampling and computations during each track access. The positioning profile of a still further embodiment of the present invention is illustrated in FIG. 3. It consists of segments 29, 31 and 37.

From a hardware perspective, this embodiment would be identical to the embodiment partially illustrated in FIG. 12, except that Applicant would not store any bias compensation values in a memory, such as the RAM 357. Instead, the microprocessor 355 would be programmed to determine the exact point in time when the heads 7 are just beginning to return to the desired track after having strayed off of it because of the static bias forces, i.e., the point 363 illustrated in FIG. 2.

At this point in time, the microprocessor 355 would then sample the motor current $I_M$ being delivered over the line 361 (see FIG. 12). It would then compute the necessary bias compensation value based on the known transfer function of the system, and would then inject it into the positioning loop, i.e., into the input 97 to the summer 87 shown in FIG. 3. (In this embodiment, the output of the fill in gain 63 would be fed directly to the input 65 of the switch 45. The summer 85 would not be used and there would be no injection of bias compensation in the velocity mode of the loop.)

Using such a technique, the heads 7 would return to the desired track in accordance with the line segment 37 shown in FIG. 2.

Although this alternative embodiment is a bit slower than the ones discussed above, it still represents a substantial time saving over the segment 35 which would otherwise result from use of the prior art integrating system. It also eliminates a good deal of circuitry, i.e., a memory and all of the components which are necessary to be used in conjunction with it.

A still further alternate embodiment of the present invention relates to the fill in gain for the desired velocity. In this embodiment, applicant chooses to substitute a multiplication circuit for the summing circuit 85 shown in FIG. 3. In this alternative embodiment, the output of the fill in gain 163 is multiplied with the bias compensation value generated by the digital-to-analog convertor 141, rather than added to it as shown in FIG. 3. This results in even tighter control and faster positioning.

Figure 13:
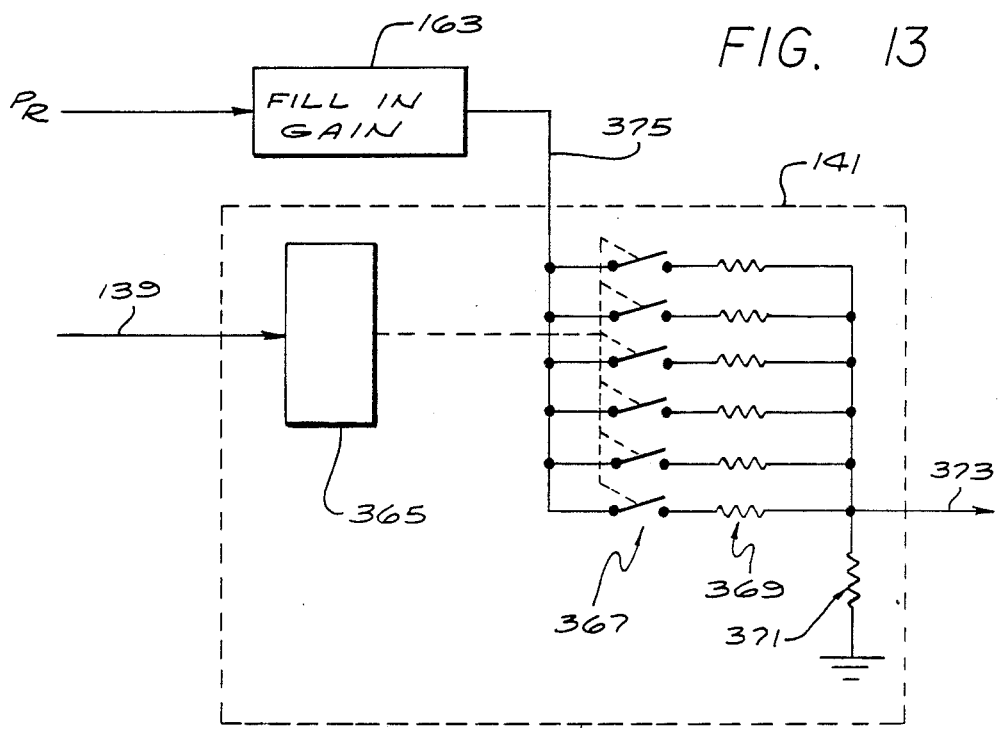
FIG. 13 is a partial block diagram of a still further alternate embodiment of the present invention.

FIG. 13 illustrates a partial block diagram of a system which achieves this multiplication without the need for providing an additional multiplying circuit. The system partially illustrated in FIG. 13 is identical to the system illustrated in FIG. 3, except that the output of the fill-in gain circuit 163 is routed directly to the digital-to-analog converter 141, and the summer 85 and the electronic switch 45 are eliminated.

A typical digital-to-analog converter 141 is functionally illustrated in FIG. 13. The digital word to be converted is inputted to the device over the bus lines 139 and into a control device 365. This control device, in turn, is connected to a plurality of electronic switches 367, there being one electronic switch for each bit of the input signal presented over the bus lines 139. As is well known in the art, when the corresponding input signal is at logic 1, the control device 365 causes closure of the corresponding electronic switch 367. Resistors 369 and resistor 371 form a voltage divider network which produce an output voltage on a line 373 which is equivalent to the input reference voltage present on a line 375 times the fractional value established by the relative values of the resistors 369 to the resistor 371. The relative values of the resistors 369 and 371 are, of course, chosen such that each switch closure will result in a voltage contribution to the output 373 equivalent to the weight of the input bit which is controlling it.

The net result will be that the bias compensation value being delivered to the digital-to-analog converter 141 over input bus lines 139 will be multiplied by the magnitude of the output of the fill in gain 163 being delivered to the digital-to-analog converter 141 over the line 375.

Although certain embodiments of the present invention have now been discussed, it should be understood and obvious to those skilled in the art that the present invention is not at all limited to the embodiments discussed above.

For example, although a hybrid of digital and analog circuitry has been discussed, the present invention could advantageously be carried out by all digital circuitry, all analog circuitry, or by a combination different than the ones discussed herein.

Similarly, although it has been suggested that certain aspects of the present invention be implemented with software while other aspects be implemented with hardware, this precise combination is by no means necessary. Several different combinations of the two could alternatively be advantageously used.

Similarly, although numerous features of the present invention have advantageously been illustrated as used in combination, this is not required. For example, the bias compensation aspects of the present invention could advantageously be used without the "fill in" aspects of the present invention, and vice versa. Moreover, although "fill in" compensation has been disclosed as being provided in both the velocity and positioning loop, such comprehensive treatment is not essential. Nor does the timing of the switch states as shown in FIG. 4 need to be precisely matched. And although two types of velocity detectors are advantageously employed, a single type could also be used, all within the scope of the present invention. However, when these features are used in combination, a far superior result is achieved.

In short, the discussion above has been for illustration purposes only. The present invention is solely that which is defined by the claims below and is intended to be limited only by these claims.

What is claimed is:

1. A hard disk drive positioning system for quickly positioning a data transfer head over a desired track on a rotating magnetic disk on command comprising:
   a. feedback circuitry, including a velocity loop, for connection to a device which controls the position of the data transfer head, to a signal indicative of the desired track, and to at least one signal indicative of a physical parameter relating to the position of the data transfer head.;
   b. high velocity means connected to said velocity loop for detecting high head velocities by measuring the frequency at which the head crosses tracks on the rotating disk; and
   c. low velocity means connected to said velocity loop for detecting low head velocities by measuring the slope of a ramp signal whose magnitude is proportional to the position of the head with respect to a particular track.

2. The positioning system of claim 1 wherein said velocity loop includes a desired velocity signal and wherein said desired velocity signal is based on the signal generated by said high velocity means while the head is travelling at high velocities and is based on the signal generated by said low velocity means while the head is travelling at low velocities.

3. The positioning system of claim 2 wherein the switch over from basing said desired velocity signal on said high velocity means to basing it on said low velocity means occurs when the head is substantially within one track of the desired track.

4. The positioning system of claim 2 wherein said actual velocity signal switches from being based on said high velocity means to said low velocity means when the head is substantially within two tracks of the desired track.

5. The positioning system of claim 1 wherein said velocity loop includes an actual velocity signal representative of the actual velocity of the head and wherein said actual velocity signal is based on the signal generated by said high velocity means while the head is travelling at high velocity and is based on the signal generated by said low velocity means while the head is travelling at low velocity.

6. The positioning system of claim 5 wherein the magnitude of the signal generated by said high velocity means is substantially equivalent to the magnitude of the signal generated by said low velocity means at the point of crossover to said low velocity means.

7. The positioning system of claim 1 wherein the input to said low velocity means includes an even and odd positioning ramp signal and wherein said low velocity means measures the slope of the even and odd positioning ramp signals only during periods of time when there is no discontinuity in their respective slopes.

8. The positioning system of claim 7 wherein said low velocity means measures said slopes by taking the derivative of said slopes.

9. A hard disk drive positioning system for quickly positioning a data transfer head over a desired track on a rotating disk upon command comprising:
   a. a high velocity loop for controlling the velocity of the head during high velocities based on the frequency at which the head crosses tracks;
   b. a low velocity loop for controlling the velocity of the head during low velocities based on a ramp signal whose amplitude is proportional to the distance by which the head is separated from a particular track;
   c. fill in means for generating a desired velocity signal at low head velocities based on the amplitude of said ramp signal; and
   d. a positioning loop for controlling the position of the head at very low velocities based on the amplitude of said ramp signal.

10. The positioning system of claim 9 wherein said high velocity loop is activated when the head must travel more than four tracks to reach the desired track, wherein said high velocity loop is deactivated and said low velocity loop is activated when the head is substantially within two tracks of the desired track, wherein said fill in means is activated when the head is substantially within one track of the desired track, and wherein said low velocity loop is disabled and said positioning loop is enabled when the head is less than one track away from the desired track.

11. The positioning system of claim 9 further including:
   a. one or more rotating disks;
   b. one or more data transfer heads, each for transferring data to or from a rotating disk;
   c. one or more arms, each attached to a data transfer head for positioning said data transfer head over a desired track on a rotating disk;
   d. a head positioning motor connected to said one or more arms for controlling the positioning of said one or more transfer heads;
   e. a power amplifier connected to said feedback circuitry an to said head positioning motor for delivering current into said head positioning motor in accordance with the signal generated by said feedback circuitry; and f. a preamplifier and demodulator connected to a data transfer head and to said feedback circuitry for amplifying a servo-track signal picked up by said data transfer head and for demodulating the same.

12. A hard disk drive positioning system for quickly positioning a data transfer head on a desired track over a rotating disk upon command comprising:
   a. a feedback loop for generating an error signal and for connection to a device which controls the position of the data transfer head, to a signal indicative of the desired track, and to at least one signal indicative of a physical parameter relating to the position of the data transfer head; and
   b. a resonant filter connected to the error signal having a combined low pass and notch response.

13. The hard disk drive positioning system of claim 12 wherein said resonant filter has substantially the following transfer function T(s):

$$T(s) = 9.5 \times 10^{-2} \frac{(S^4 + 2.51 \times 10^4 S^3 + 7.85 \times 10^8 S^2 + 1.66 \times 10^{13} S + 8.77 \times 10^{16})}{(S^4 + 3.28 \times 10^4 S^3 + 4.11 \times 10^8 S^2 + 1.53 \times 10^{12} S + 6.51 \times 10^{15})}$$

14. A hard disk drive positioning system for quickly positioning a data transfer head over a desired track on a rotating disk upon command and for reducing positioning delays caused by static bias forces which are asserted against the data transfer head comprising:
   a. motor means connected to the data transfer head for positioning the data transfer head over the desired track;
   b. feedback circuitry connected to said motor means for controlling said motor means;
   c. memory means for storing a plurality of static bias compensation values, each of said values representing the amount of static force which must be asserted by said motor means to maintain the data transfer head over a particular track, each of said values having been derived from a measurement of the static force; and
   d. injection means connected to said memory means and to said feedback circuitry for injecting a signal in said feedback circuitry before the data transfer head reaches the desired track and for maintaining that signal after the data transfer head reaches the desired track, the amount of said signal being based on the static bias compensation value which corresponds to the desired track.

15. The hard disk drive positioning system of claim 14 wherein each of the static bias compensation values represents an average of the static bias forces found to exist at a particular track on a sample group of positioning systems.

16. The hard disk drive positioning system of claim 14 wherein said injection means does not inject the signal in said feedback circuitry until the data transfer head is close to the desired track.

17. A hard disk drive positioning system for quickly positioning a data transfer head over a desired track on a rotating disk upon command and for reducing positioning delays caused by static bias forces which are asserted against the data transfer head comprising:
   a. motor means connected to the data transfer head for positioning the data transfer head over the desired track;
   b. feedback circuitry connected to said motor means for controlling said motor means;
   c. memory means for storing a plurality of static bias compensation values, each of said values representing the amount of static force which must be asserted by said motor means to maintain the data transfer head over a particular track;
   d. interpolation means connected to said memory means for approximating the correct static bias compensation value for a desired track which has no corresponding bias compensation value stored in said memory means based on the bias compensation values which are stored in said memory means; and
   e. injection means connected to said memory means, said interpolation means, and to said feedback circuitry for injecting a signal in said feedback circuitry before the data transfer head reaches the desired track and for maintaining that signal after the data transfer head reaches the desired track, the amount of said signal being based on the static bias compensation value which corresponds to the desired track.

18. A hard disk drive positioning system for quickly positioning a data transfer head over a desired track on a rotating disk upon command and for reducing positioning delays caused by static bias forces which are asserted against the data transfer head comprising:
   a. motor means connected to the data transfer head for positioning the data transfer head over the desired track;
   b. feedback circuitry connected to said motor means for controlling said motor means;
   c. memory means for storing a plurality of static bias compensation values, each of said values representing the amount of static force which must be asserted by said motor means to maintain the data transfer head over a particular track;
   d. acquisition means connected to said memory means and to said feedback circuitry for ascertaining each of said static bias compensation values and for delivering the same to said memory means for storage each time power is applied to the hard disk drive positioning system; and
   e. injection means connected to said memory means and to said feedback circuitry for injecting a signal in said feedback circuitry before the data transfer head reaches the desired track and for maintaining that signal after the data transfer head reaches the desired track, the amount of said signal being based on the static bias compensation value which corresponds to the desired track.

19. A hard disk drive positioning system for quickly positioning a data transfer head over a desired track on a rotating disk upon command and for reducing positioning delays comprising:
   a. motor means connected to the data transfer head for positioning the data transfer head over the desired track;
   b. feedback circuitry connected to said motor means for controlling said motor means, said feedback circuitry including a velocity loop, said velocity loop including a desired velocity input command;
   c. fill in means connected to said feedback circuitry for injecting in said velocity loop only during low head velocities a fill in signal having a magnitude which is proportional to actual head velocity, said fill in signal used to control said desired velocity input command.

20. The positioning system of claim 19 wherein said fill in signal is injected when the head is substantially within one track of the desired track.

21. The positioning system of claim 14 wherein the magnitude of said fill in signal is directly proportional to the velocity of the head.

22. The positioning system of claim 19 wherein said system generates a ramp signal having a magnitude indicative off the head position and wherein said fill in signal constitutes a linear scaling of said ramp signal.

* * * * *